INVENTORS: FRANK A. MORRIS
GERALD R. PAUL
CHARLES R. FISHER, JR
BY Francis E Blake
ATTORNEY Sept. 30, 1958 F. A. MORRIS ET AL 2,854,521

SIGNALING SYSTEM

Filed Feb. 21, 1957 6 Sheets-Sheet 5

Sept. 30, 1958 F. A. MORRIS ET AL 2,854,521

SIGNALING SYSTEM

Filed Feb. 21, 1957 6 Sheets-Sheet 6

United States Patent Office 2,854,521

Patented Sept. 30, 1958

2,854,521

SIGNALING SYSTEM

Frank A. Morris, Fishers, Gerald R. Paul, Webster, and Charles R. Fisher, Jr., Rochester, N. Y., assignors to General Dynamics Corporation, Rochester, N. Y., a corporation of Delaware Application February 21, 1957, Serial No. 641,759

17 Claims. (Cl. 179—18)

This invention relates to signaling systems and particularly to dial pulsing systems used in communication systems.

The object of the invention is to provide a register sender useful in telephone systems having wide range tolerance to subscriber dial pulsing and providing precisely timed and shaped trains of outgoing switch setting pulses.

The invention consists of electronic means for receiving and registering the signals incoming from a subscriber's dial limited in their timing only by the slow releasing characteristics of a conventional first slow relay. A binary chain of triggers is used to respond to the pulses of an incoming train and since these triggers are extremely fast in operation they will respond properly to the highest speed dial pulses that may be sent by any mechanical dialing device. Likewise they will respond equally well to low speed dialing approaching the limit imposed by the said slow releasing characteristics of the conventional first slow relay. And, again, the proportion of make to break in the dial operation is completely immaterial so long as there is a definite make and a definite break in the dial circuit. Thus the very precise adjustment of the subscriber dials to assure proper proportions of make to break of the dial contacts and actual speed of operation may be disregarded so that dials varying in these respects, and therefore more economically manufactured and maintained may be supplied and employed.

The register section of the register sender of the present invention will respond to trains of incoming pulses over an extremely wide range of periodicity, proportionate pulse length and regularity whereas the sender portion of the device is constructed and arranged to transmit switch setting pulses very precisely timed and regulated in periodicity, proportionate pulse length and regularity.

The register sender of the present invention thus becomes a useful link between a subscriber dial station, poor in construction and operation and erratically operated by a subscriber, and a train of switches constructed and arranged to be operated by trains of pulses transmitted with great precision and regularity.

The principle of registering and sending is that known as subtracting one and storing the complement. Let us take, for example, the transmisison by the subscriber of the telephone number digit 4. The subscriber operates his dial from the finger hole for the decimal digit 4 and thus sends a train of pulses in the form of four successive breaks in the telephone circuit. This is registered by the device of the present invention and when the transmisison of the called telephone number is completed, the same train of four pulses is transmitted out for switch setting purposes.

The train of four pulses in seriatim is written up on a binary chain in the form of a binary number having a 1 bit, a 2 bit, a 4 bit and an 8 bit place. Usually the progression of the bits as they advance in value is read from right to left so that the decimal digit 4 is equal to the binary number 0100. However, for convenience in circuitry the binary numbers herein are turned backwards and the decimal digit 4 is represented by the binary number 0010 much in the manner that the decimal number 321 would be read as one hundred and twenty three. The table of binary numbers employed herein is as follows.

| | |
|---|---|
| Zero | 0 0 0 0 |
| 1 | 1 0 0 0 |
| 2 | 0 1 0 0 |
| 3 | 1 1 0 0 |
| 4 | 0 0 1 0 |
| 5 | 1 0 1 0 |
| 6 | 0 1 1 0 |
| 7 | 1 1 1 0 |
| 8 | 0 0 0 1 |
| 9 | 1 0 0 1 |
| 10 | 0 1 0 1 |
| 11 | 1 1 0 1 |
| 12 | 0 0 1 1 |
| 13 | 1 0 1 1 |
| 14 | 0 1 1 1 |
| 15 | 1 1 1 1 |

In accordance with the present invention the train of four impulses will be registered as 1100. Thus from the decimal value 4, the value 1 is subtracted. Thereafter the binary number 1100 is stored as 0011, that is, the code is inverted. When this is spoken of as storing the complement, it must be understood that it is the 15's complement that is meant for the binary number 0011 is equal to the decimal value 12 which is equal to (15—3).

The following table shows the decimal digit dialed, the code registered and the codes stored.

| Digit | Registered | Stored |
|---|---|---|
| 1 | 0 0 0 0 | 1 1 1 1 |
| 2 | 1 0 0 0 | 0 1 1 1 |
| 3 | 0 1 0 0 | 1 0 1 1 |
| 4 | 1 1 0 0 | 0 0 1 1 |
| 5 | 0 0 1 0 | 1 1 0 1 |
| 6 | 1 0 1 0 | 0 1 0 1 |
| 7 | 0 1 1 0 | 1 0 0 1 |
| 8 | 1 1 1 0 | 0 0 0 1 |
| 9 | 0 0 0 1 | 1 1 1 0 |
| 0 | 1 0 0 1 | 0 1 1 0 |

Further, in accordance with the present invention the stored value 0011 is later counted down as follows:

| | |
|---|---|
| Stored value | 0 0 1 1 |
| 1st pulse | 1 0 1 1 |
| 2nd pulse | 0 1 1 1 |
| 3rd pulse | 1 1 1 1 |
| 4th pulse | 0 0 0 0 |

whereby a train of four pulses is created and transmitted for switch setting purposes, the same in number as the train transmitted into the register sender from the subscriber's dial.

The device thus consists of a binary chain responsive to a subscriber's dial, a plurality of storage registers equal in number to the number of digits employed in the telephone designations and a binary chain for transmitting the outgoing switch setting pulses. There is also a chain of steering in devices for steering each digit into a different storage register and a like steering out chain for successively transferring the stored digits to the outgoing binary chain.

Additionally, there is provided a timing means, herein consisting of an adjustable multivibrator by which the rate of impulsing and the proportions of make to break in the outgoing trains of switch setting pulses may be precisely controlled. This multivibrator, in its preferred embodiment, comprises a pair of transistors included in a circuit having adjustable timing control circuits.

A feature of the invention is a register responsive to dial pulses which will translate a train of pulses transmitted in seriatim into a binary number one less in value than the decimal number in value of the said pulses of the said train. Given a binary chain, a train of pulses transmitted into the lowest order code place thereof will operate the elements of the chain to express the true binary code equivalent to the number of pulses in this train. However, a characteristic of this feature is that means is provided to set or prime this binary chain to 15 or 1111, so that actually the counting of the binary chain starts at one less than zero. A single pulse, then, instead of advancing the binary chain from zero to one, actually advances it from fifteen to zero, whereby a value of one is effectively subtracted from the decimal value of the digit transmitted.

Another feature of the invention is a binary chain of bistable triggers each having a binary digit element for each of the binary digits 0 and 1, and means for transferring the record of the 0 binary digits to corresponding elements of a storage register. Since the storage register thus writes up the 0 binary digits, the inverse of the originally registered code is stored. The inverse code thus written up constitutes the original decimal digit minus one stored as the (15's) complement thereof.

Another feature of the invention is a means to prime the outgoing binary chain to the binary representation of zero and to then transfer thereto the said stored 15's complement of a number thereto so that when the counting down process takes place the number of counting down pulses will equal the number of pulses in the original decimal train, the counting down consisting of the regular advance of the said chain from the set value in accordance with the principles of binary counting to the point where the last place trigger changes from a 1 bit to a 0 bit. This last change will constitute a signal that the counting has been completed.

Another feature of the invention is a means embodied in the first digit storage register for signaling the fact that the digit stored therein is a single digit which alone will be transmitted by the subscriber or, alternatively, that it is the first of a plurality of digits which will be transmitted by the subscriber. By looking at the character of the codes stored as follows:

| | |
|---|---|
| 1 | 1 1 1 1 |
| 2 | 0 1 1 1 |
| 3 | 1 0 1 1 |
| 4 | 0 0 1 1 |
| 5 | 1 1 0 1 |
| 6 | 0 1 0 1 |
| 7 | 1 0 0 1 |
| 8 | 0 0 0 1 |
| 9 | 1 1 1 0 |
| 10 | 0 1 1 0 |

it will be noted that only the codes for the decimal digits 9 and 10 (0 on the dial) have a 0 in the last place. Furthermore it may also be noted that only the codes for the decimal digits 7 and 8 have 00 in the second and third place. If it is desired to make the storage of a 9 or a 10 act as a signal that only this digit will be transmitted by the subscriber, as when he dials 0 for the operator, then a gate will be closed in order to trigger a last digit signal. If it is desired to extend this kind of service and make the digits 7 and 8 also to produce such last digit signals then a gate will be closed in the second and third element storage circuits for this same purpose.

In accordance with this feature a neon lamp is provided in a circuit whereby when the corresponding storage element is not active, the neon lamp will be aglow and thus provide a low resistance path for a reading pulse to be transmitted to a last digit element. When the corresponding storage element is active then the said neon lamp is effectively short circuited and being not aglow interposes a virtual open circuit for the said reading pulse.

Another feature of the invention is the use of neon glow lamps in the triggering paths for the bistable triggers of the outgoing binary chains. Such neon glow lamps constitute virtual open circuit means to prevent the transmission of hash therebetween but, being biased near their breakdown potentials, respond readily to the high voltage triggering pulses and provide substantially closed circuit paths for such pulses. So-called hash from switching transients and the uneven nature of the discharge currents in the gas tubes give rise to potential variations which, while ordinarily minute, may nevertheless occasionally produce a spike sufficiently great to trigger one of the nonconducting tubes. The use of such neon lamps in the triggering circuits therefore act as open circuit means and prevent the transmission of such potential spikes arising from the so-called hash. By biasing such an ionizable circuit closing device somewhat near its breakdown potential, little if any hindrance is offered to legitimate signals while the bar to back potential spikes from hash is very greatly increased. In other words, the use of such neon glow lamps in the starter circuits of the trigger tubes lowers the requirements for legitimate signals while at the same time it raises the requirements for random signals. The biasing of these glow lamps substantially converts them into directional diodes. For the purposes herein used these very inexpensive devices have superior characteristics to the more costly germanium diodes and other junction rectifiers.

Another feature of the invention is the means for the temporary enablement of the register sender under the sole control of the conventional first slow relay. The register sender is normally "dead" since no one of the tubes therein is provided with its necessary operating potential. When the device is seized in conventional manner by the operation of the calling bridge relay, the RD (release delay) relay is operated and this relay remains operated thereafter until the calling subscriber releases the connection. The RD relay by its operation closes a break in the circuit of the positive source of potential supplied to all the anodes of the tubes and thus enables the register sender. This circuit is then maintained throughout the use of the circuit. However, if the calling subscriber releases the connection, then in a short interval depending on the slow releasing characteristics of the RD relay the entire network will be released regardless of the pattern of operation of its tubes. Thus, if the calling subscriber realizes that he has made a mistake such as having in error dialed a wrong digit, he may erase the whole record and start over again by the simple expedient of depressing his hookswitch for a brief interval.

Other features will appear hereinafter.

The drawings consist of six sheets having ten figures, as follows.

Figure 3:
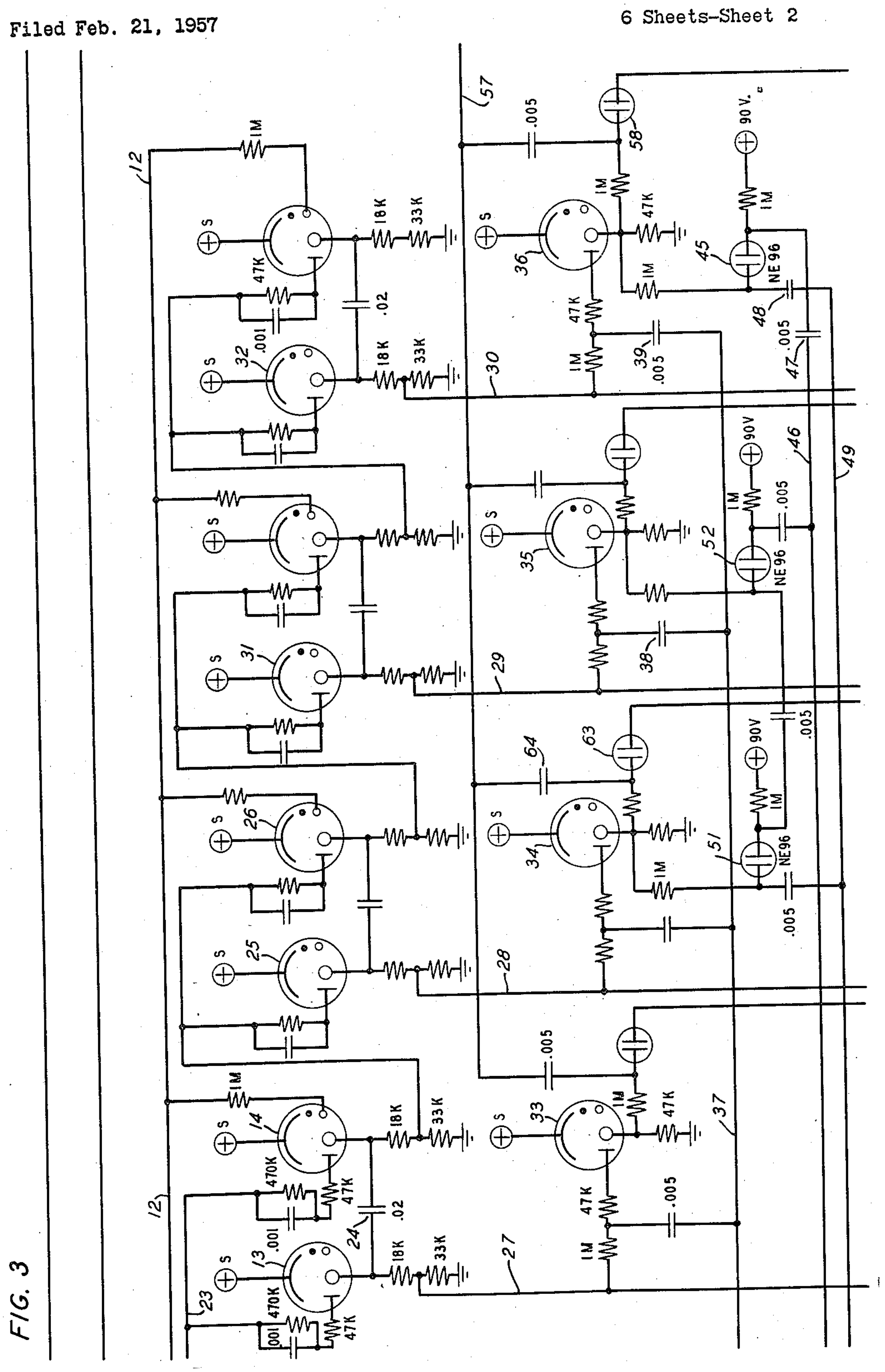
Fig. 3 is a schematic circuit diagram showing the binary chain for registering in binary code one less than the decimal value of each incoming digit and the first store for storing the record established in the binary chain in inverted form.
Figure 4:
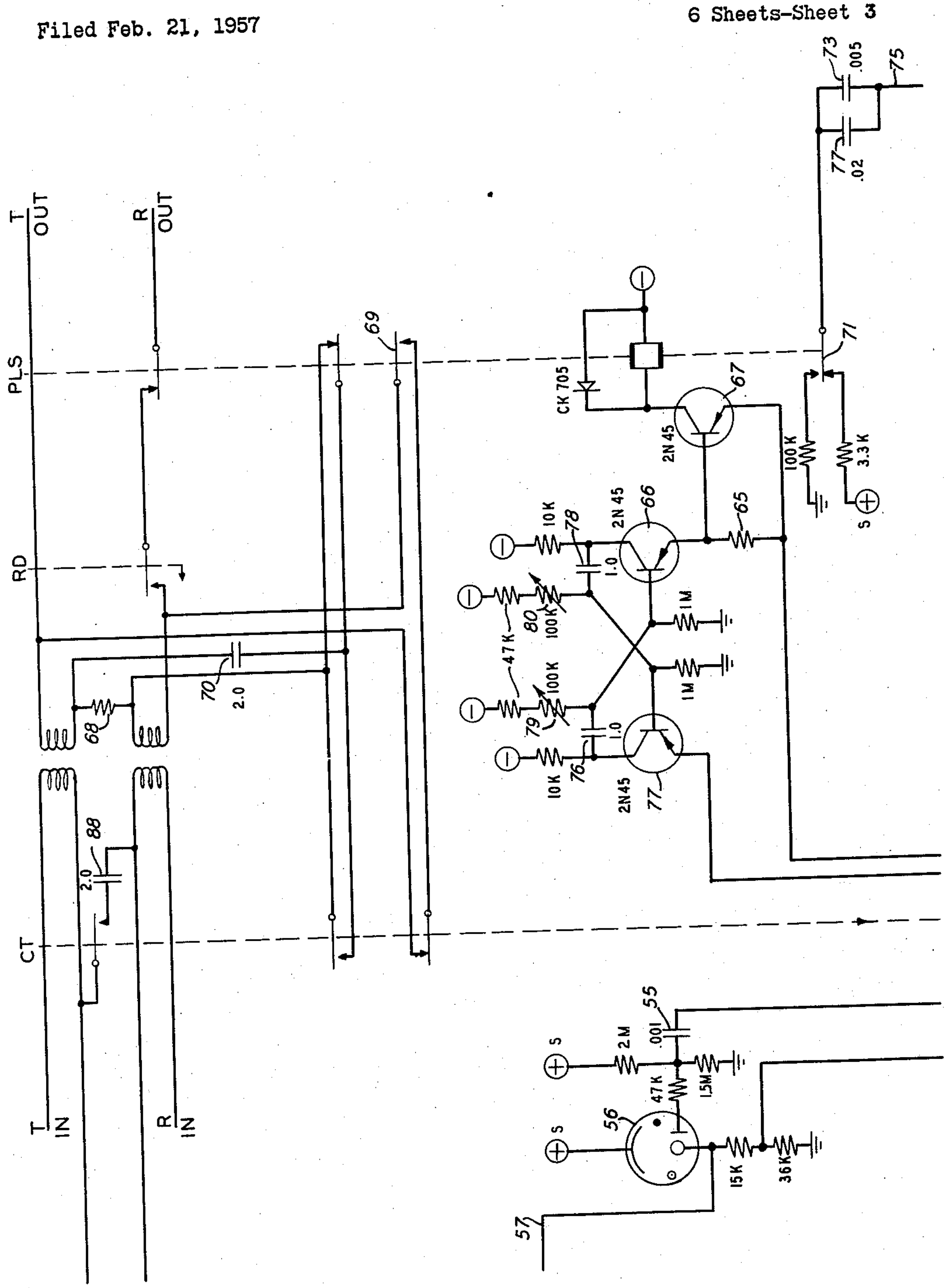
Figure 5:
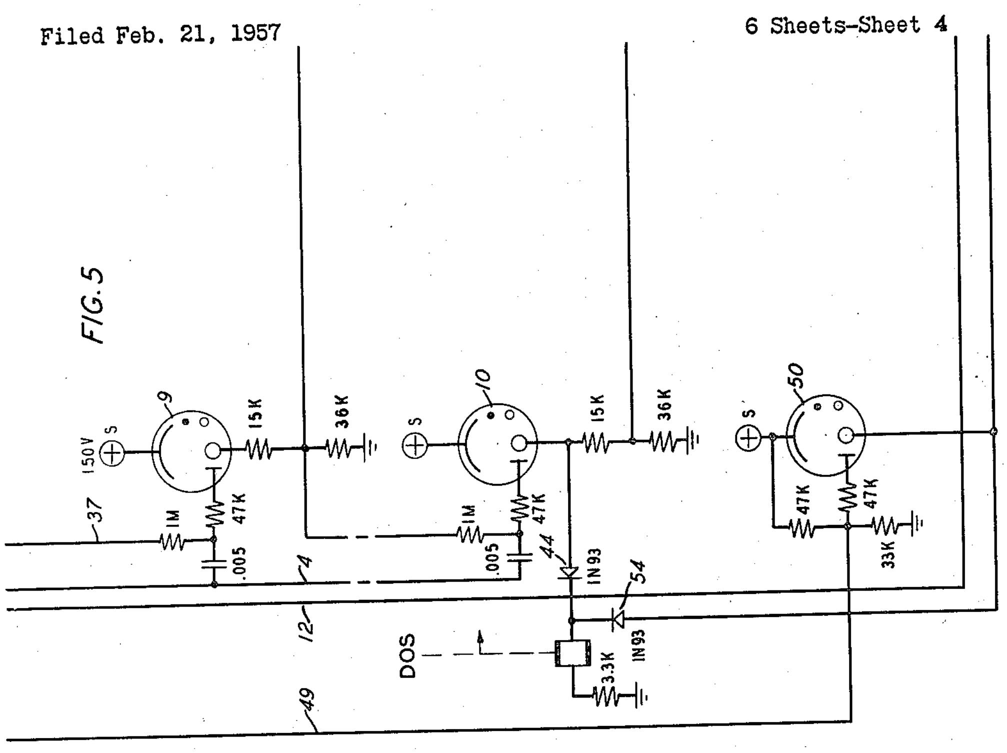
Figure 9:
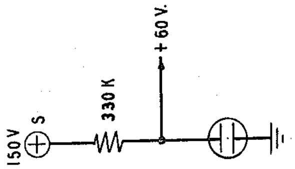
Figure 10:
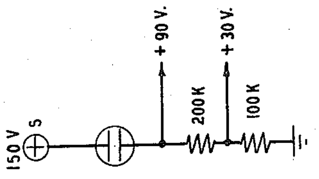
Figure 8:
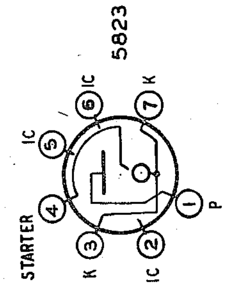
Figure 6:
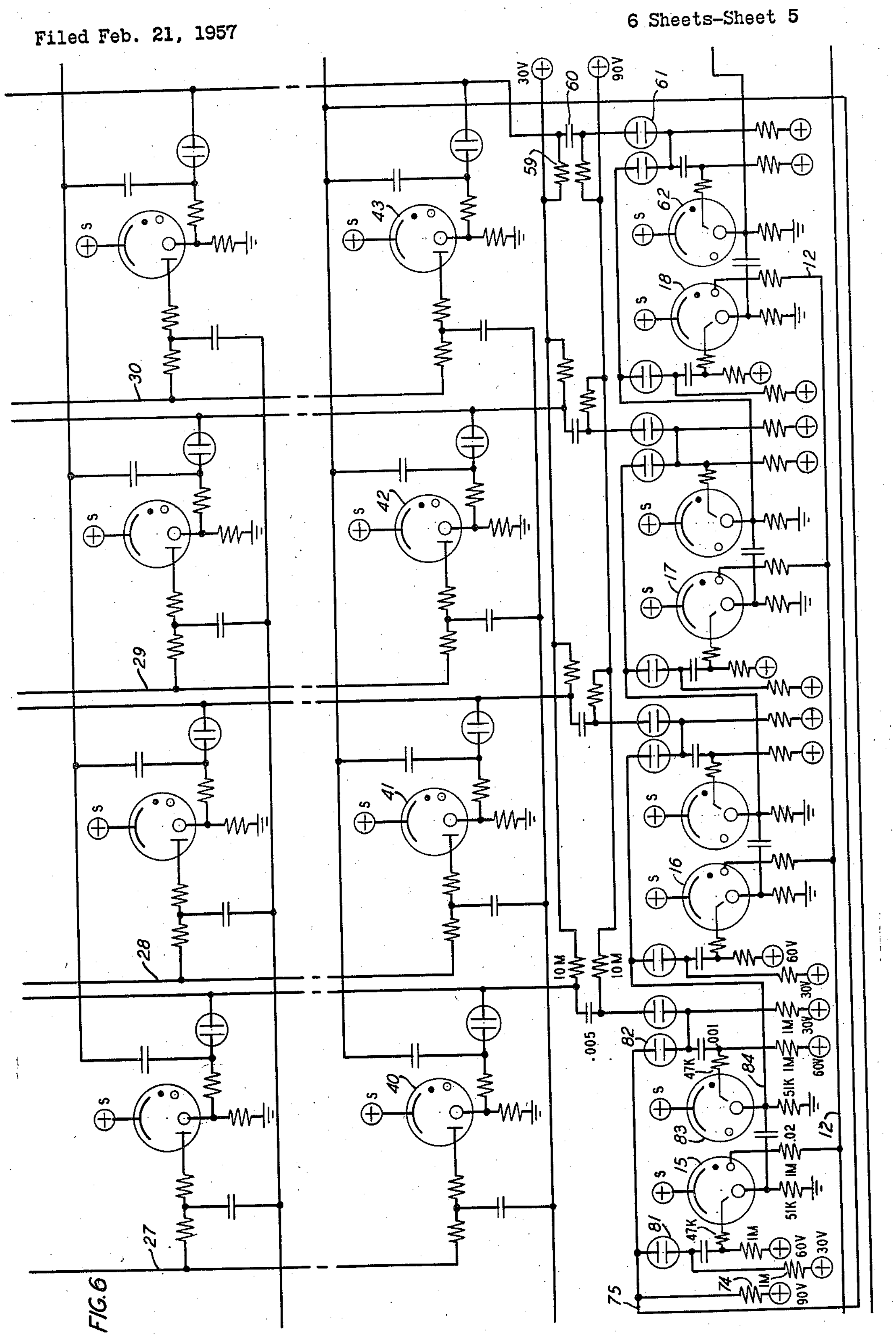
Figure 7:
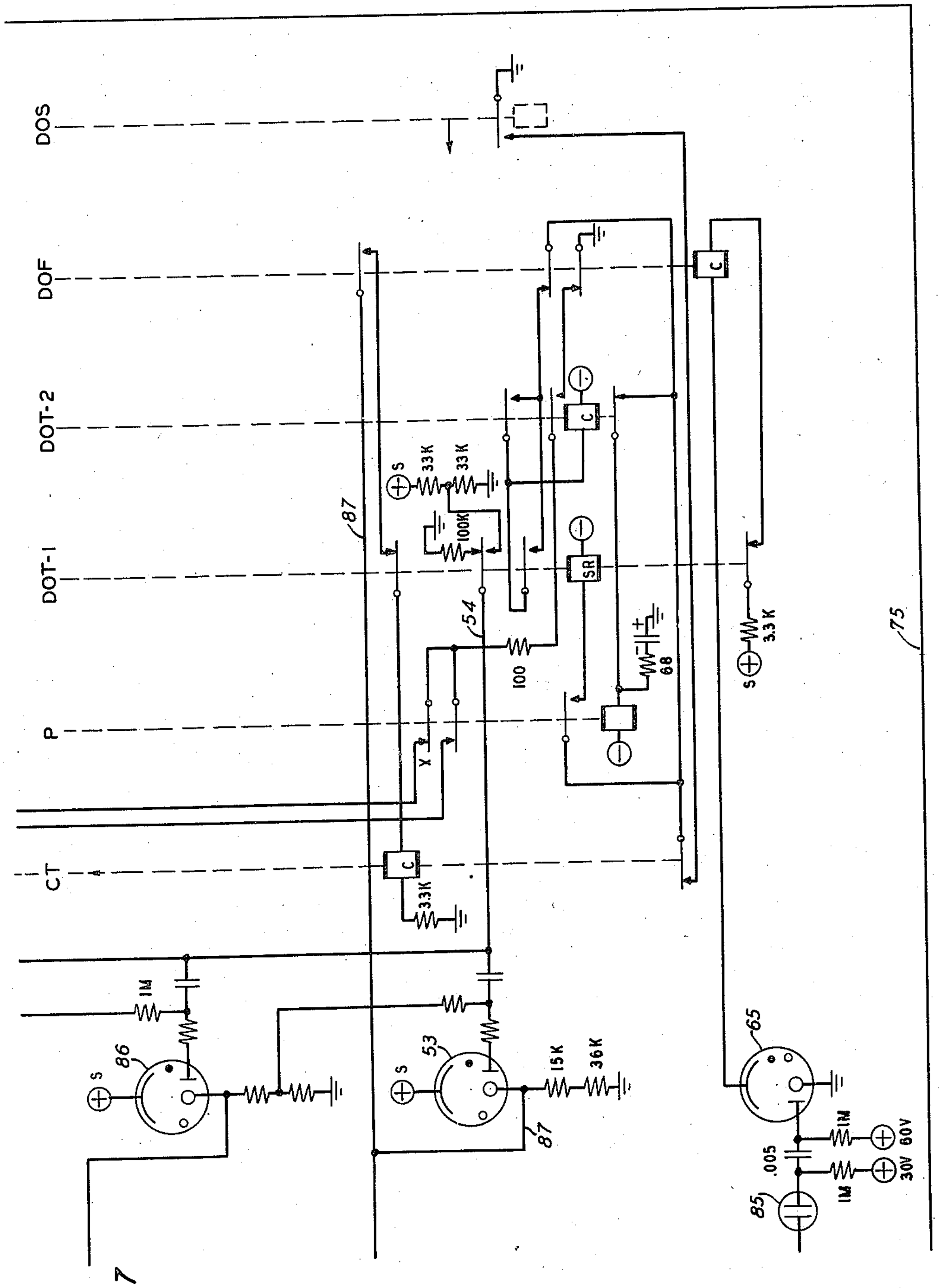

Fig. 4 is a schematic circuit diagram showing the incoming and the outgoing terminals of the register sender and the relay armature contacts by which the outgoing pulses are created, the transistorized multivibrator for controlling the periodicity, the proportionate pulse length and the regularity of the trains of outgoing pulses together with the first of a chain of steering out tubes associated with the said first store of Fig. 3;

Fig. 5 is a schematic circuit diagram showing the steering in tubes for stores 2 and 3 and a last digit tube used to signal the fact that the first digit stored will be the last or only digit that will be transmitted into the register sender and which will therefore control the starting of the transmission of the trains of outgoing pulses;

Fig. 6 is a schematic circuit diagram showing a second and a third store and the outgoing binary chain which successively takes the inverted codes stored in the various stores and counts them down;

Fig. 7 is a schematic circuit diagram showing the steering out tubes associated with the second and third stores, the end signal tube which responds to a condition created when the outgoing binary chain has been counted down to a predetermined value and the relay arrangement for the control of the transistorized multivibrator of Fig. 4 and the transmission of the trains of outgoing pulses;

Fig. 8 is a conventional socket diagram showing the relative placement of the various pins of a commercially available tube (5823) which may be used for the purposes of the present invention;

Fig. 9 and Fig. 10 are what may be termed thumbnail circuit diagram sketches showing potential values attained in certain voltage divider circuits using a neon glow tube and which may serve as needed sources of given potentials.

It is hereby stated that in the drawings many specific electronic components such as tubes, neon glow lamps, resistors, condensers, transistors, and so on are shown by way of example and to set forth a preferred form of the invention and it will be understood that the invention is not dependent on these specific types of devices or the values given but is capable of a wide variety of embodiments in which the principles disclosed herein are set forth.

The principal electronic component herein employed is a small relay service cold cathode gas tube commercially designated 5823, the characteristics of which are fully set forth in various pamphlets such as that entitled Receiving-Type Tubes for Industry and Communications published by the Radio Corporation of America. From Fig. 8 it will appear that this tube has an anode connected to pin 1, a cathode connected to pins 3 and 7, a starter connected to pin 4 and three pins 2, 5 and 6 each having an internal connection. Applicants make use of one of these internal connections as an extra starter by which certain tubes of the binary chains may be primed.

Figures 1, 2:
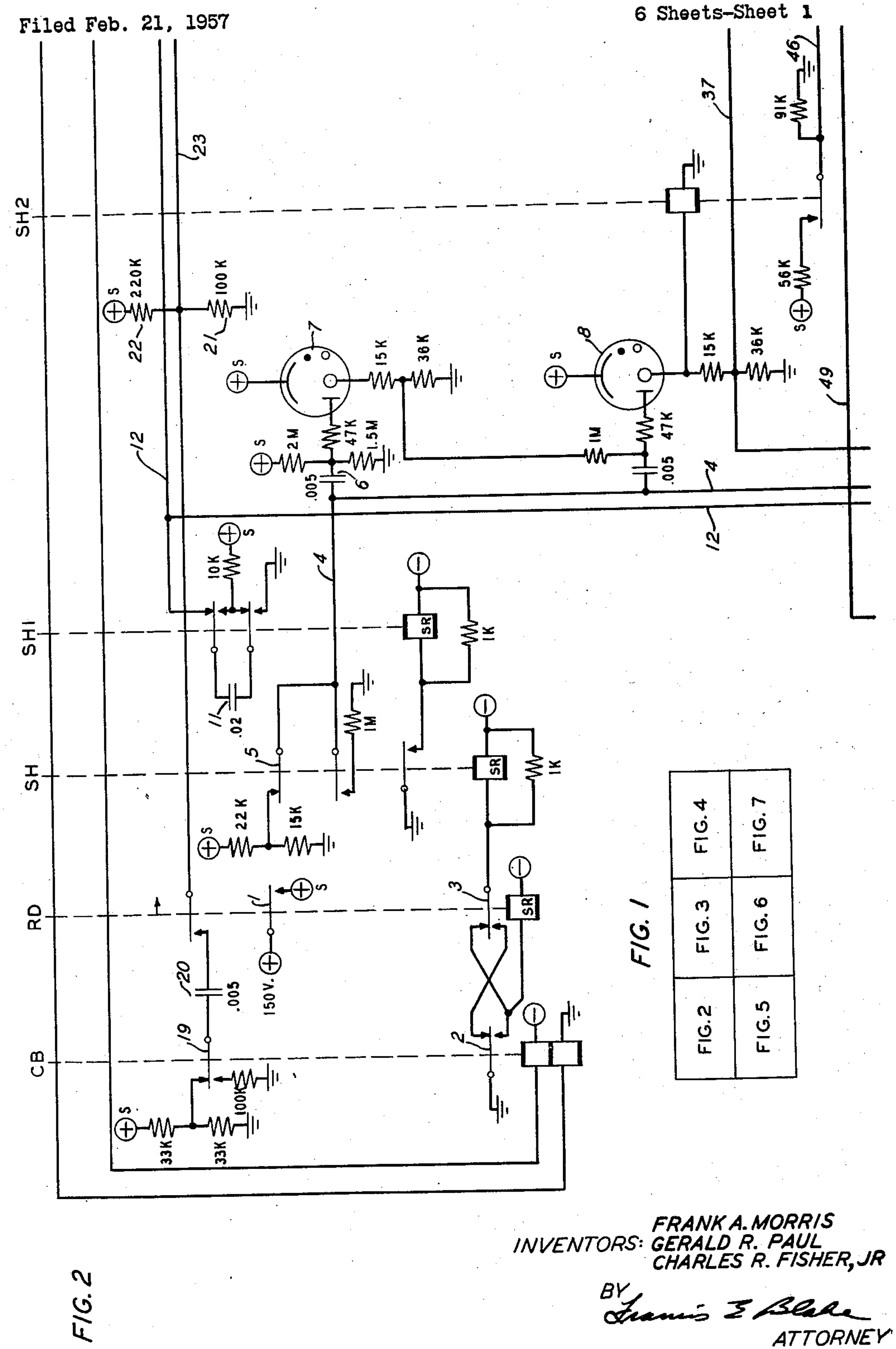
Fig. 1 is a block diagram on the same sheet with Fig. 2, showing how the six sheets containing Figs. 2 to 7 inclusive may be placed to make a complete schematic circuit diagram of the means provided by the present invention.
Fig. 2 is a schematic circuit diagram of the conventional calling bridge relay and its train of slow releasing relays used in the registering of the incoming digital signals together with the first two of a chain of steering in tubes which control the transfer of a first registered digit to the first store.

The register sender of the present invention is seized in a conventional manner by placing a bridge including a dial across the circuit including the incoming tip and ring conductors shown in Fig. 4, whereby current will flow through the windings of the calling bridge CB relay shown in Fig. 2 and the windings of the repeating coil shown in Fig. 4. The CB relay, operated, causes the operation of the conventional release delay RD relay and this relay operates and remains operated steadily thereafter as long as the calling bridge across the incoming tip and ring conductors is maintained. It will be noted that the RD relay through its armature 1 will establish a connection from a source of 150 volts positive to a circuit point marked + and designated S. This represents the sustaining voltage on which the whole operation of the device depends and it will be noted that all points in the circuitry are supplied from this point. It therefore appears that the operation of the RD relay enables the device and that at any time when the calling subscriber wishes to abandon the use of the device he may remove the calling bridge whereupon the RD relay controlled by its slow releasing characteristics will release and by disabling the source of sustaining potential return the complete device to its normal unoperated state.

Upon the operation of the CB relay and before the movement of the armatures of the RD relay a circuit will be established from ground over armature 2 and front contact of the CB relay, back contact and armature 3 of the RD relay and the winding of the SH relay to battery. Since the RD relay operates very quickly thereafter it will be noted that the SH relay and its slave SH–1 will be operated only for a fleeting instant, the relay SH maintaining its operated position momentarily due to its slow releasing characteristics and the SH–1 maintaining its operated position for a slightly longer period due to its slow releasing characteristics. Thus as the register sender is seized the SH relay will operate and release and its slave SH–1 will operate and release shortly after the release of SH.

Upon the operation of the SH relay the conductor 4 is grounded and upon the release of this relay this conductor is connected through armature 5 of the SH relay to a positive potential intermediate between ground and the sustaining potential S. This constitutes a positive pulse through the condenser 6 sufficient to trigger the tube 7 but insufficient to trigger any one of the tubes 8, 9 or 10 each of these latter tubes having a substantially ground potential on their starters at this time. It will be noted that after the tube 7 is triggered the connection from its cathode resistor will raise the potential on the starter of tube 8 so that this tube is readied to respond to the next pulse over conductor 4, which will be described hereinafter.

On the operation of the SH–1 relay, the condenser 11 is placed in a charging circuit between ground and the sustaining potential and when shortly thereafter relay SH–1 releases, a high potential pulse is delivered from condenser 11 to priming conductor 12.

Now it may be noted that the binary counting chain of the register consists of four pairs of tubes such as the pair of tubes 13 and 14, of which the tube 13 represents a 0 binary digit and the tube 14 represents a 1 binary digit. Since the conductor 12 is connected to a starting connection to the 1 binary digit tube of each pair this binary chain is thereupon primed to express the binary number 1 1 1 1

In like manner the conductor 12 leads to starters of the 0 binary digit tube of each of the pairs constituting the sender binary chain and hence tubes 15, 16, 17 and 18 are triggered so that the sender binary chain is primed to express the binary number 0 0 0 0

The primed condition of these two binary chains will be maintained until further operations take place.

In due time the subscriber will dial a first digit and the train of dial pulses equal in number to the value of the digit will successively release the CB relay an equal number of times. Upon the release of the CB relay, its armature 19 will discharge the condenser 20 and then connect it to a positive potential intermediate between ground and the sustaining potential. This, added to the potential supplied by the voltage divider consisting of the resistors 21 and 22, will transmit a pulse over the conductor 23 leading in parallel to the starters of tubes 13 and 14, and which will be effective only in the non-conducting tube 13, so that tube 13 will be triggered. This pulse will also be transmitted through the condenser 24 to the cathode of tube 14 and since it is higher in potential than the potential of this cathode, will effectively short circuit this tube by rendering its reliance on the anode cathode current flow unnecessary which will result in the quenching of tube 14. Also this pulse from condenser 24 being positive in nature will cause a like positive pulse to be transmitted to the two starters of the next pair of tubes 25 and 26. This in turn will trigger tube 25 and quench tube 26. Thus it will be seen that the first pulse transmitted by the CB relay will change the expression in the register binary chain from 1 1 1 1 to 0 0 0 0

The second pulse transmitted by the CB relay will then trigger the tube 14 and quench the tube 13 but in this case the triggering pulse is transmitted in the other direction in the condenser 24 and does not affect the starters of tubes 25 and 26. This is a conventional and well known binary counting chain operation. If the incoming digit dialed is a four, then it will be seen that the chain is advanced from a value 1 1 1 1 (which is one less than zero) to a value 1 1 0 0 (which is three, or is the value four from which one has been subtracted). Thus at the end of this operation the potentials on conductors 27 and 28 will be Down (that is substantially at ground potential) while the potentials on conductors 29 and 30 will be Up (that is at a potential intermediate between ground and the potentials of the cathodes of the active tubes 31 and 32). The Down potentials on the starters of tubes 33 and 34 will render these tubes unresponsive to a pulse on the conductor 37 whereas the Up potentials on the starters of tubes 35 and 36 will render these tubes responsive to such an impulse.

During the sending of this train of four pulses the SH relay and the SH–1 relay will have been operated and therefore a short interval after the end of this train, a pulse will first be transmitted over the conductor 4 and thereafter a pulse will be transmitted over the conductor 12.

The pulse over the conductor 4 will now operate the steering in tube 8 (which was primed as hereinbefore described) and the consequent Up condition established on conductor 37 will constitute a positive going pulse over condensers 38 and 39 to trigger the two tubes 35 and 36. By the triggering of tubes 35 and 36, the code 1 1 0 0 established in the binary chain tubes is inverted and registered as 0 0 1 1 in this first store.

The pulse on conductor 12 following immediately thereafter will prime the tubes of the register chain and thus change any expression (the expression 1 1 0 0 just described) to the starting expression 1 1 1 1 ready for the next dialed digit.

It may now be noted that the next steering in tube 9 is primed by the Up condition on the conductor 37 so that it will respond to the next pulse on conductor 4. Tube 8 being in a conducting state will not be affected by such next pulse.

It should be noted that three stores such as that represented by the tubes 33 to 36 inclusive are provided but it will be understood that this is representative and that as many such stores may be provided as are necessary to register the full length telephone designations employed.

It should also be noted that the last digit steering in tube 10 as it becomes active to transfer the last digit from the incoming binary chain to the last store consisting of the tubes 40 to 43 inclusive will put an Up condition on the diode 44 and thus operate the DOS relay which upon energization starts the transmission of outgoing pulses.

Before going on to the transmission of outgoing pulses, a special arrangement in connection with the first store should be noted. Looking at the circuit of the tube 36 it will be noted that when this tube is active its cathode is Up, that is due to the operation thereof and due to about a 60 volt internal drop, its cathode stands at about 90 volts and the left terminal of the neon glow lamp 45 will be at the same potential as its right terminal so this NE96 glow lamp will be inactive. However, when the tube 36 is inactive the two terminals of the glow lamp will stand at values which will cause the lamp to glow. In the first instance the lamp 45 forms an effective barrier to a pulse on conductor 46 whereas in the second instance by its substantial low resistance when aglow it will pass such a pulse. It then will be noted that as the steering in tube 8 is triggered to transfer the registered digit to the first store, the Up condition produced on the cathode thereof will cause the operation of the SH2 relay and this relay, in operating, will connect the sustaining potential to the conductor 46 thus passing a pulse through the condenser 47, the glow lamp 45 when aglow, the condenser 48 and the conductor 49 to the starter of tube 50. A similar arrangement in association with tubes 34 and 35 is provided by the glow lamps 51 and 52 so it will be seen that as this first digit is stored it will also cause the operation of the last digit tube 50 when its 8 bit tube 36 registers the 0 binary digit (for decimal digits 9 and 10 only) or when the 2 and 4 bit tubes 34 and 35 simultaneously register the 0 binary digit (for decimal digits 7 and 8 only).

The tube 50 shares a cathode resistor with the last steering out tube 53 (Fig. 7) and when this tube 50 is triggered its cathode goes Up and through the diode 54 causes the operation of the DOS relay. This relay then becomes a signal that the last digit either of a multidigit designation or a single digit designation has been registered and that the stage of operation has been reached where the transmission of the output digits must be started. The connections to the winding of the DOS relay are shown in Fig. 5 but the armature and contact thereof are shown to the right in Fig. 7.

Upon the operation of the DOS relay a circuit will be extended from ground, through a back contact and armature of the CT cut through relay, a back contact and armature of the DOT–2 relay and the winding of the P relay to battery. The P relay opens the two leads to the transistorized multivibrator before the circuit for the operation thereof can be closed by the DOT–2 relay. Relay P, operated, also closes an obvious circuit for the slow releasing relay DOT–1 and this relay extends the ground from the front contact of the DOS relay over an armature and back contact of the DOF relay, front contact and armature of the operated DOT–1 relay and the winding of the DOT–2 relay to battery. The DOT–2 relay operates and locks independently of the DOT–1 relay and opens the circuit of the P relay so that pulsing may start.

Looking for a moment to the upper portion of Fig. 4, it will be noted that when the register sender is seized, one of the contacts of the RD relay whose winding is shown in Fig. 2 will be closed so that the loop from the outgoing T conductor to the outgoing R conductor will be closed for the conventional purposes. Therefore the armature and back contact of the PLS (pulse) relay will act as the transmitter of switch setting pulses. To anticipate somewhat, it will be noted that when the last train of pulses has been sent and the cut through relay has been operated, the bridge across the outgoing windings of the repeating coil will be opened by the CT relay so that voice currents may be transmitted over this repeating coil.

Now it will be noted that upon the energization of the slow releasing DOT–1 relay, the conductor 54 will be transferred from a ground connection to a high potential point (midway between ground and the sustaining potential) whereby a pulse through condenser 55 is passed to the starter of tube 56. Tube 56 fires and places an Up condition on conductor 57. It will be remembered that, by way of example, the tubes 35 and 36 were described as active. Therefore, the cathode of tube 36 is Up, that is at about 90 volts, so that the left terminal of neon glow lamp 58 stands at 90 volts whereas its right terminal stands at 30 volts by way of resistor 59. Under these conditions the neon glow lamp constitutes a diode and will pass a pulse from the Up movement of conductor 57 through the glow lamp 58, thence through the condenser 60, the glow lamp 61, similarly biased, to the starter of the trigger tube 62 to cause this last tube to display the binary digit 1. Contrariwise, the store tube 34 was described as being not active, so that zero voltage or ground potential stands on the left terminal of neon glow lamp 63 and plus 30 volts stands on its right terminal. This neon glow lamp thus constitutes a diode pointed in the opposite direction; that is, it will not pass a pulse derived in condenser 64 from the "Up" condition on conductor 57. Thus upon the operation of the slow release relay DOT-1 the inverted digit stored in the first store is transferred to the outgoing binary chain, which is now ready to be counted down. As hereinbefore described, it will take four counting down steps to advance the record 0 0 1 1 successively through the values 1 0 1 1, 0 1 1 1, 1 1 1 1 to 0 0 0 0 where the change of the right hand binary digit from 1 (tube 62 active) to 0 (tube 18 active) will constitute a signal that the counting down process has reached the desired point and where the transmission of the digit will be terminated by the firing of tube 65.

Returning now to the release of the P relay, it may be noted that this has a conventional fast acting armature marked X and that this closes the circuit through resistor 65 to the emitter of transistor 66 and directly to the emitter of transistor 67. It will be noted that the emitter of both these transistors is positive with respect to the collector of each and that the base is at an intermediate potential. The emitter collector current of transistor 67 operates the PLS relay and therefore opens the outgoing loop, this break in the circuit constituting a switch setting pulse. The outgoing loop is normally closed through the resistor 68 and the two coils of the repeating coil but for transmission purposes this circuit is short-circuited by the armature 69 of the PLS relay during each pulse and the circuit of the condenser 70, bridged about the resistor 68, is opened at this time.

By its lower armature 71 the PLS relay grounds the condensers 72 and 73 so that when the relay releases it will produce a triggering pulse over the conductor 75.

Upon the first energization of the transistor 66 the base current so affects the condenser 76 and the potential of the collector of transistor 77 and the condenser 78 so affects the potential of the base transistor 77, that this transistor does not produce an emitter collector flow. However, as the charges on these two condensers 76 and 78 change, the transistor 77 becomes active and thereby affects these two condensers to the point where transistor 66 and transistor 67 cease to be active. Transistors 77 and 66 therefore alternate in their operation at a periodic rate. The periodicity of the interaction of these transistors is a function of the values of the condensers 76 and 78 and the base potential circuits including the adjustable resistors 79 and 80. Not only the periodicity of the interaction of these transistors may be adjusted and fixed but the proportionate pulse lengths may be likewise adjusted and fixed. It will thus appear that the PLS relay will be caused to operate periodically at a closely adjusted rate and in which the relative lengths of operation and release are also closely controlled.

Upon the first release of the PLS relay a pulse is transmitted over the conductor 75 and since the upper terminals of both neon glow lamps 81 and 82 are standing at substantially 90 volts and their lower terminals at substantially 30 volts, this pulse will pass into the starters of both tubes 15 and 83. Since at this time the tube 15 is active, the result of this pulse will be to quench the tube 15 and cause the tube 83 to become active. This produces an effectively negative pulse on the conductor 84 leading to the triggering circuit of the next pair of tubes in this binary chain and hence there is no operation produced therein.

It is believed that the step by step counting down of this chain is clear. On the last pulse when the expression in this chain changes from 1 1 1 1 to 0 0 0 0, the tube 65 will be triggered. It will be noted that while the tube 62 is active its cathode is at substantially 90 volts so that the left terminal of the neon glow lamp 85 stands at substantially 90 volts while its right hand terminal stands at substantially 30 volts. Therefore the triggering pulse for the last pair of tubes 18 and 62 will appear as a positive pulse on the cathode of the tube 62 and will pass through the neon glow lamp to trigger the tube 65.

Tube 65, becoming active, causes the operation of the DOF relay and this relay stops the further operation of the transistor multivibrator and the PLS relay. The operation of the DOF relay also releases the DOT-2 relay so that ground from the front contact of the DOS relay is again applied to the P relay and this in turn closes the circuit for the slow releasing DOT-1 relay. The DOT-1 relay opens the circuit of the DOF relay so that DOT-2 reoperates and releases the P relay and this in turn releases DOT-1.

Upon the operation of DOT-1 another pulse is produced on the conductor 54 and since the tube 56 is active the starter of tube 86 is Up so that this pulse on conductor 54 triggers the second steering in tube 86. Therefore the record on the second store is transferred to the outgoing binary chain and is then counted down as before.

When the tube 53 is triggered to transfer the record of the last store to the outgoing pulse binary chain, the conductor 87 connected to the cathode of tube 53 goes Up. Hence at the end of the counting down of this last digit and upon the operation of the DOF relay a circuit will be closed thereby for the operation of the CT cut through relay. This relay opens the ground from the DOS relay and stops any further operation of the P relay, the DOT-1 relay and the DOT-2 relay. Relay DOF remains operated until the connection is released by the subscriber.

The cut through relay, also steadily operated until the connection is released, bridges the condenser 70 across the resistor 68 and also bridges the condenser 88 across the T and R conductors to the calling bridge relay for voice current transmission purposes.

When the subscriber releases or when conventionally this register sender having performed its function is released, the release of the RD relay by disconnecting the source of positive potential from the sustaining potential connection will inactivate this circuit and release all tubes. The sources of intermediate potentials shown in Figs. 9 and 10 used for biasing the neon tube glow lamps depending on the source of sustaining potential will also be inactivated.

What is claimed is:

1. In a signaling system, a register sender for registering decimal digits transmitted as trains of impulses in seriatim and for creating and transmitting therefrom like trains of impulses in seriatim, consisting of a binary chain constructed and arranged to register the binary equivalent of one less than the value of each decimal digit transmitted thereinto, a plurality of stores sufficient in number to store the maximum number of digits expected, means for inverting and transferring each digit registered in said binary chain on a succeeding one of said stores, an output binary chain, means for successively transferring the record in each said store to said output binary chain, means for counting down the record in said binary chain and means for transmitting an outgoing impulse on each step of said counting down operation.

2. In a signaling system, a register sender for registering decimal digits transmitted as trains of impulses in seriatim and for creating and transmitting therefrom like trains of impulses in seriatim, consisting of means for registering in binary code the equivalent of one less than the value of each decimal digit transmitted thereinto, means for storing the inverse of said codes, means for counting down said inverted codes and means responsive to said counting down means for transmitting an outgoing pulse for each step in the operation thereof.

3. In a signaling system, a register sender for registering decimal digits transmitted as trains of impulses in seriatim and for creating and transmitting therefrom like trains of impulses in seriatim, consisting of a binary counting chain responsive to incoming trains of impulses, means for priming said chain to a value one less than zero in binary code, whereby each digit is registered in binary code equivalent to one less than the value of the decimal digital value of said train of incoming impulses, means for inverting said registered code, means for storing said inverted code, there being a plurality of said storing means equal to the number of digits to be transmitted into said register, an outgoing pulse binary counting chain, means for selectively and successively transferring said inverted and stored codes to said outgoing pulse binary counting chain, means for counting down said codes transferred to said outgoing chain, and means for transmitting a pulse for each operational step of said counting down means.

4. In a signaling system, a register sender for registering decimal digits transmitted as trains of impulses in seriatim and for creating and transmitting therefrom like trains of impulses in seriatim, consisting of an incoming chain of electronic bistable trigger circuits connected in cascade for registering said incoming pulses in binary code, means for priming said chain to a starting expression in binary code of one less than zero, an outgoing chain of electronic bistable trigger circuits connected in cascade and responsive to an incoming train of pulses to count in accordance with the binary codes, means for priming said outgoing chain to a starting expression in binary code of zero, means for inverting a binary code registered in said incoming chain and transferring it to said outgoing chain, means for applying to said outgoing chain a succession of impulses to count down said code transferred thereto until the binary code for zero is reached, means for transmitting an outgoing pulse for each counting down pulse, and means responsive to the reaching in said counting down process of the value zero for terminating said counting down operation.

5. In a signaling system, a wide tolerance register sender for registering decimal digits transmitted as trains of impulses in seriatim and for creating and transmitting therefrom like trains of impulses in seriatim, consisting of an incoming chain of bistable trigger circuits connected in cascade and responsive to incoming pulses transmitted in seriatim over a wide range of speed of succession and a wide range of proportions of relative signal length to length of intervals between signals, said incoming chain of trigger circuits being constructed and arranged to count said incoming pulses and to display the count made in the form of a binary number, an outgoing pulse chain of bistable trigger circuits connected in cascade and arranged to count a series of pulses applied thereto, means for transferring a count from said incoming chain to said outgoing pulse chain, means for thereafter applying a series of pulses to said outgoing chain, and means responsive to the reaching of a predetermined count by said outgoing chain for disabling said pulse applying means.

6. In a signaling system, a register sender for registering decimal digits transmitted as trains of impulses in seriatim and for creating and transmitting therefrom like trains of impulses in seriatim, consisting of a register accurately responsive to incoming pulses over an extremely wide range of periodicity, proportionate pulse length and regularity and limited for low timing only by the release characteristics of a conventional slow releasing relay, and a sender settable by said register for translating the record established in said register into a train of a like number of pulses precisely regulated in periodicity, proportionate pulse length and regularity.

7. In a signaling system, a register sender for registering decimal digits transmitted as trains of impulses in seriatim and for creating and transmitting therefrom like trains of impulses in seriatim consisting of an electronic binary counter responsive to incoming pulses over an extremely wide range of periodicity, proportionate pulse length and regularity and limited for low timing only by the release characteristics of a conventional slow releasing relay, means for starting said binary counter at one less than zero, a plurality of stores, one for each digit to be transmitted into said register, means for transferring the inverse of the setting of said counter at the end of the registration of a digit to one of said stores, a sender consisting of an electronic binary counter, means for priming said sender to express zero in binary code, means for transferring a stored code to said sender, means for counting down said sender to zero, and means for transmitting outgoing pulses therefrom during said counting down process, said counting down means and said transmitting means being controlled to transmit trains of pulses of precisely regulated in periodicity, proportionate pulse length and regularity.

8. In a signaling system, a register sender for registering a predetermined number of decimal digits transmitted in an erratic timing sequence as trains of impulses in seriatim and for creating and transmitting therefrom trains of like numbers of impulses in seriatim, consisting of a register accurately responsive to incoming pulses over an extremely wide range of periodicity, proportionate pulse length and regularity and limited for low speed timing only by the release characteristics of a conventional slow releasing relay, a plurality of digit stores successively set by each succeeding train of impulses transmitted into said register, a sender successively responsive to said stores for transmitting therefrom trains of like numbers of impulses, and means for controlling said sender to transmit said trains with precise regularity and to transmit the pulses of said trains precisely regulated in periodicity, proportionate pulse length and regularity.

9. In a signaling system, a register sender for registering decimal digits transmitted as trains of impulses in seriatim and for creating and transmitting therefrom like trains of impulses in seriatim, consisting of a subscriber controlled circuit having a calling bridge relay responsive to impulses of said trains and a slow release relay responsive to said calling bridge relay, a register consisting of a binary chain of gas tube trigger circuits for registering each digit successively transmitted to said calling bridge relay, a plurality of stores for successively storing said registered digits, each said store consisting of a plurality of gas tubes, a sender consisting of a binary chain of gas tube trigger circuits successively responsive to said stores for successively transmitting therefrom outgoing digits equal in number, value and order of succession to the incoming digits registered, and a source of enabling potential for all said gas tubes of said device controlled by said slow release relay.

10. In a signaling system, a register sender for registering decimal digits transmitted as trains of impulses in seriatim and for creating and transmitting therefrom like trains of impulses in seriatim, consisting of a subscriber controlled circuit having a calling bridge relay responsive to impulses of said trains and a slow releasing relay responsive to said calling bridge relay, an electronic network including a plurality of gas tubes and a source of enabling potential for said gas tubes controlled by said slow releasing relay.

11. In a signaling system a register sender for registering decimal digits transmitted as trains of impulses in seriatim and for creating and transmitting therefrom like trains of impulses in seriatim, consisting of a binary chain of cold cathode tubes for registering each incoming digit, a plurality of stores each consisting of a plurality of cold cathode tubes and each for storing a separate digit, a binary chain of cold cathode tubes for successively taking said registered digits for transmission of outgoing digits, means to count down said last binary chain, a pair of transistors in a multivibrator circuit for controlling said counting down means, means to adjust the operation of said multivibrator in periodicity of operation and in proportionate timing of said two transistors, said multivibrator controlling the transmission of outgoing impulses.

12. In a signaling system, a register sender for registering digits transmitted as trains of impulses in seriatim and for creating and transmitting therefrom like trains of impulses in seriatim, consisting of a cold cathode electronic register, a plurality of cold cathode stores for successively storing digits registered in said register and a cold cathode sender consisting of a cold cathode electronic register for successively receiving said stored digits for translation into trains of impulses in seriatim and a transistorized multivibrator for creating and transmitting said trains, said output register and said multivibrator being in a mutually controlled circuit.

13. In a signaling system, a register sender for registering digits transmitted as trains of impulses in seriatim and for creating and transmitting therefrom like trains of impulses in seriatim, consisting of a register for receiving and registering each incoming train of pulses, a plurality of stores for successively storing a plurality of said registered digits, a last digit signaling means for controlling the start of the transmission of outgoing pulses, a sender for successively translating said stored digits into trains of outgoing impulses, and means controlled by the first and the last of said stores in order for operating said last digit signaling means.

14. In a signaling system, a register sender for registering digits transmitted as trains of impulses in seriatim and for creating and transmitting therefrom like trains of impulses in seriatim, consisting of a register for receiving and registering each incoming train of impulses, a plurality of stores for successively storing a plurality of said registered digits, a last digit signaling means for controlling the start of the transmission of outgoing impulses, a sender for successively translating said stored digits into trains of outgoing impulses, means controlled by the operation of said last of said stores and by the storing of certain predetermined digits in the first of said stores for operating said last digit signaling means.

15. In a signaling system, a register sender for registering decimal digits transmitted as trains of impulses in seriatim and for creating and transmitting therefrom like trains of impulses in seriatim, consisting of a register for receiving and registering each incoming train of impulses, a plurality of stores for successively storing a plurality of said registered digits each in a four place inverted binary code, a last digit signaling means for controlling the start of the transmission of outgoing impulses, a sender for successively translating said stored digits into trains of outgoing impulses, means controlled by the operation of said last of said stores and by the appearance of 0 binary digits in predetermined code places in the first of said stores for operating said last digit signaling means.

16. In a signaling system, a register sender for registering decimal digits transmitted as trains of impulses in seriatim and for creating and transmitting therefrom like trains of impulses in seriatim, consisting of a register for receiving and registering in binary code digits each one less in decimal value than each decimal digit transmitted thereinto, a plurality of stores each for storing a single registered digit therein arranged to store said registered digits in seriatim, means for inverting said registered digits and for transferring said inverted binary codes into said stores, a last digit signaling means for controlling the start of the transmission of outgoing impulses, a sender in the form of a binary code counter for successively receiving and registering said stored digits, means for counting down said sender and for transmitting an outgoing impulse on each said counting down step, means controlled by the operation of said last of said stores and by the appearance of 0 binary digits in predetermined code places in the first of said stores for operating said last digit signaling means.

17. In a signaling system, a register sender for registering decimal digits transmitted as trains of impulses in seriatim and for creating and transmitting therefrom like trains of impulses in seriatim, consisting of a register for receiving and registering in binary code digits each one less in decimal value than each decimal digit transmitted thereinto, a plurality of stores each for storing a single digit therein arranged to store said registered digits in seriatim, means for inverting said registered digits and for transferring said inverted binary codes into said stores, a last digit signaling means for controlling the start of the transmission of outgoing impulses, a sender in the form of a binary code counter for successively receiving and registering said stored digits, means for counting down said sender and for transmitting an outgoing impulse on each said counting down step, means controlled by the operation of said last of said stores for operating said last digit signaling means and a neon glow lamp connected in the circuit of the first of said stores for closing an operating circuit for said last digit signaling means, said neon glow lamp being operated in response to the storing of a particular code therein.

No references cited.